(12) United States Patent
Worthing et al.

(10) Patent No.: US 8,364,372 B2
(45) Date of Patent: Jan. 29, 2013

(54) HYBRID POWERTRAIN WITH ELECTRONIC THROTTLE AND METHOD OF CONTROLLING THROTTLE POSITION

(75) Inventors: James L. Worthing, South Lyon, MI (US); John N. Stockbridge, Novi, MI (US); Thomas Richard Durkin, Oxford, MI (US); Joseph E. Ploucha, Commerce Township, MI (US); Richard B. Jess, Haslett, MI (US); Brian D. Essenmacher, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 12/845,806

(22) Filed: Jul. 29, 2010

(65) Prior Publication Data

US 2012/0029742 A1      Feb. 2, 2012

(51) Int. Cl.
*G05D 1/00* (2006.01)
(52) U.S. Cl. .................. 701/85; 123/376; 123/406.52; 123/683; 123/462
(58) Field of Classification Search .................. 701/84, 701/85, 101; 123/41.07, 41.13, 323, 328, 123/336, 337, 339.23, 376, 398, 406.52, 123/406.74, 683, 684, 462, 568.19; 180/335; 91/26, 274, 335
See application file for complete search history.

(56) References Cited

U.S. PATENT DOCUMENTS

| | | | |
|---|---|---|---|
| 6,523,522 B1 | 2/2003 | Costin | |
| 7,082,925 B2 | 8/2006 | Katrak et al. | |
| 2008/0178827 A1* | 7/2008 | Ervin et al. | 123/90.11 |
| 2008/0288153 A1* | 11/2008 | Bauerle et al. | 701/101 |
| 2010/0038158 A1* | 2/2010 | Whitney et al. | 180/65.265 |

* cited by examiner

*Primary Examiner* — Mary Cheung
(74) *Attorney, Agent, or Firm* — Quinn Law Group, PLLC

(57) ABSTRACT

A hybrid powertrain and a method of controlling a throttle in an engine of the hybrid powertrain are provided. A throttle system has a throttle at an optimal position for the engine to power a first motor/generator when an electric throttle motor is de-energized to minimize current consumption by the throttle motor. The electric throttle motor is energizable to adjust the position of the throttle. A biasing member biases the throttle to a default position when the electric throttle motor is not energized. The hybrid powertrain has a first motor/generator operatively connected to the engine, and a second motor/generator operatively connected to the generator and operable for providing output power. The engine is operable in a predetermined optimal state to provide power to the generator for powering the first motor/generator. The throttle is at a predetermined position when the engine is in the predetermined optimal state.

6 Claims, 3 Drawing Sheets

HYBRID POWERTRAIN WITH ELECTRONIC THROTTLE AND METHOD OF CONTROLLING THROTTLE POSITION

TECHNICAL FIELD

The invention relates to a hybrid powertrain with an electronically-controlled throttle and a method of controlling the position of the throttle.

BACKGROUND

The throttle of an internal combustion engine is a valve that directly regulates the amount of air entering the engine, indirectly controlling the power output of the engine. At wide open throttle, the intake manifold is at or near ambient atmospheric pressure. When the throttle is partially closed, a manifold vacuum develops and the resistance to movement of the pistons in the cylinders increases.

An accelerator pedal is typically used by a vehicle operator to mechanically control the position of the throttle. In other vehicles the throttle is electronically-controlled based on engine operating conditions, such as the position of the accelerator pedal, but there is no mechanical linkage between the accelerator pedal and the throttle.

SUMMARY

A hybrid powertrain and a method of controlling an electronic throttle in an engine of the hybrid powertrain are provided. The hybrid powertrain may be for a variety of applications, such as a motor vehicle, a ship, a building, or another application that utilizes a motor/generator. The throttle system is configured so that the throttle is at an optimal position for the engine to power a first motor/generator when the throttle motor is de-energized. Specifically, a hybrid powertrain is provided that includes an engine with an electronically-controlled throttle system. An "electronically-controlled throttle system" has a throttle that is not mechanically-connected to an accelerator pedal or to other operator input. The throttle is adjustable in position to change power output of the engine. The throttle system also includes an electric throttle motor energizable to adjust the position of the throttle, and a biasing member biasing the throttle to a default position when the electric throttle motor is not energized. The hybrid powertrain has a first motor/generator operatively connected to the engine, and a second motor/generator operatively connected to the first motor/generator and operable for propelling the vehicle. The first motor/generator is operable to provide electric power to the second motor/generator. At least one controller is operatively connected to the throttle motor, to the engine, and to the motor/generators. In one embodiment, an engine controller is connected to the engine and the throttle motor, and a module that functions both as a power inverter and motor controller is connected to the motor/generators.

The engine is operable in a predetermined optimal state to provide power to the first motor/generator for powering the second motor/generator. The throttle is at a predetermined position when the engine is in the predetermined optimal state. The "predetermined optimal state" is a predetermined set of operating parameters of the engine considered to result in the best combination of fuel efficiency, output torque and speed. The default position of the throttle is selected to be substantially the same as the predetermined position of the throttle. The at least one controller is operable to energize and de-energize the electric throttle motor so that the throttle is biased to the default position when the position of the throttle is within a predetermined range of the default position for a predetermined amount of time. By setting the default position as the position at which the engine is in the predetermined optimal state, electrical energy for powering the throttle motor is minimized, and throttle motor wear is likewise reduced. The optimal operating state of the engine is also sufficient to provide "limp home" capability if vehicle electrical power is interrupted. Engine torque is not a concern during "limp home" state on an extended range electrical vehicle as described above, as even fully open throttle will not result in excessive power at the vehicle wheels as only the second motor/generator can directly affect tractive power.

A method of controlling an electronic throttle on an engine of a hybrid powertrain described above, such as a hybrid vehicle, is an algorithm that determines whether both a commanded position of the throttle and an actual position of the throttle are within a predetermined range of the de-energized position, starting a portion of the algorithm that functions as a timer if both the commanded position of the throttle and the actual position of the throttle are determined to be within the predetermined range of the de-energized position, and de-energizing the throttle motor when the timer has been on for at least a predetermined period of time with the actual position and the commanded position are both within the predetermined range of the default position. The de-energized position is selected for the engine to operate in the predetermined optimal state to power the first motor/generator.

The above features and advantages and other features and advantages of the present invention are readily apparent from the following detailed description of the best modes for carrying out the invention when taken in connection with the accompanying drawings.

DETAILED DESCRIPTION

Figure 1:
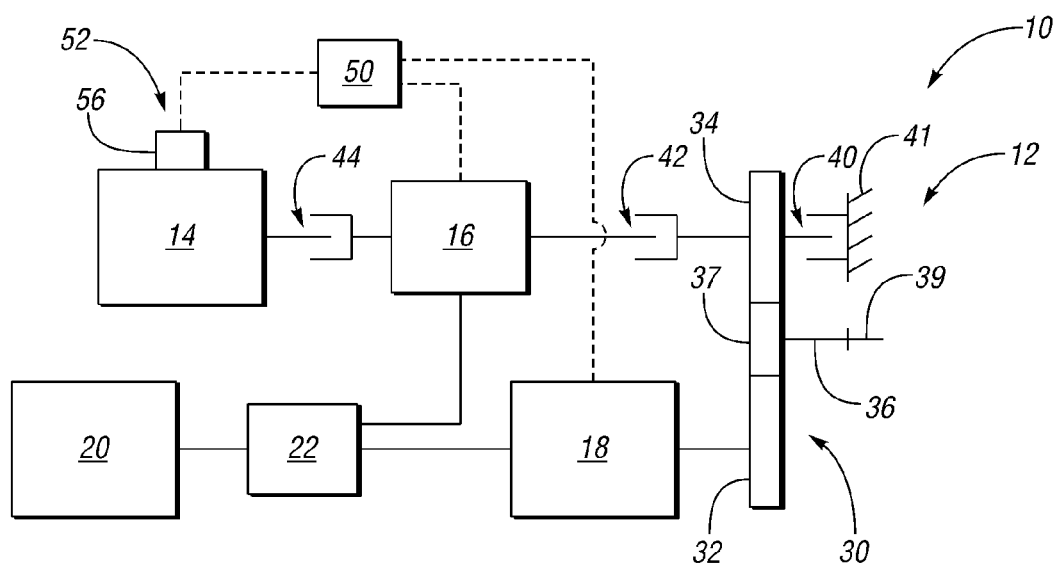
FIG. 1 is a schematic illustration of an extended range electric hybrid powertrain having an electronic throttle control system.

Referring to the drawings, wherein like reference numbers refer to like components throughout the several views, FIG. 1 shows a hybrid vehicle 10 with a hybrid powertrain 12. Although the powertrain 12 is shown as a vehicle, such as an automotive vehicle, the powertrain 12 may also be used for powering a ship, as a power plant for a building, or for any application that utilizes an engine and a motor/generator to provide power.

The powertrain 12 includes an engine 14 that powers a first motor/generator 16. The first motor/generator 16 provides electrical power to a second motor/generator 18 by generating electrical energy that is delivered through a module 22 that functions as a motor controller and a power inverter. In some operating modes, the first motor/generator 16 may also be controlled to function as a motor. A battery 20 can also provide power to the second motor/generator 18 through the module 22. The battery 20 may be one or more batteries forming a battery pack. The second motor/generator 18 is connected for common rotation with a sun gear member 32 of a planetary gear set 30. The sun gear member 32 meshes with pinion gears 37 supported by a carrier member 36. The carrier member 36 rotates with an output member 39 connected through a remaining drive train and vehicle wheels (not shown) to propel the vehicle 10. The pinion gears 37 also mesh with a ring gear member 34 of the planetary gear set 30.

The powertrain 12 includes three torque-transmitting mechanisms: a brake-type clutch 40, referred to herein as brake 40, and two rotating-type clutches 42 and 44. When the powertrain 12 is operating in a first electric vehicle mode, brake 40 is engaged to ground the ring gear member 34 to a stationary member 41, and power flows from the battery 20 through the second motor/generator 18 and planetary gear set 30 to the output member 39. When the powertrain 12 is operating in a second electric vehicle mode, brake 40 is disengaged, clutch 42 is engaged, clutch 44 is disengaged, and power flows from battery 20 through the first motor/generator 16 and second motor/generator 18, and through planetary gear set 30 to the output member 39.

If the state of charge of the battery 20 drops too low, clutch 44 and brake 40 are engaged. The engine 14 is run to power the first motor/generator 16 to provide power to the second motor/generator 18 via the module 22. During load-sharing electric mode, clutch 42 is engaged to allow both first motor/generator 16 to function as a motor and add power through ring gear 34 while second motor/generator 18 adds power through sun gear 32. During another load-sharing mode, clutches 42 and 44 are engaged, allowing the engine 14 to provide power to the ring gear member 34 while second motor/generator 18 provides power to the sun gear member 32. During regenerative braking, clutch 42 is engaged and torque at the output member 39 is slowed by converting rotational energy into electrical energy via the first motor/generator 16. The operating state of the engine 14 does not affect the torque at the output member 39, as the engine 14 is used only to power the generator 16. Such a powertrain configuration on a vehicle is sometimes referred to as an extended range electric vehicle, because the use of the engine 14 to power the first motor/generator 16 extends the driving range of the vehicle 10 in comparison to the driving range based solely on using stored energy from the battery 20.

Figure 2:
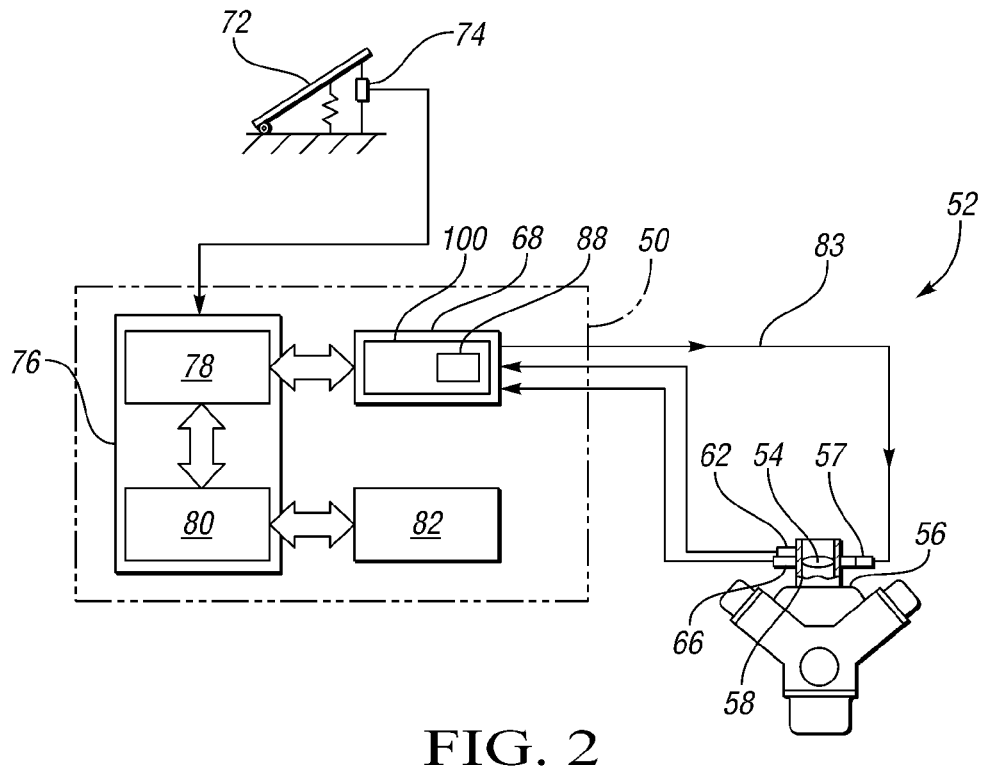
FIG. 2 is a schematic illustration of the electronic throttle control system of FIG. 1 having a spring biasing the throttle to a default position.

An electronic controller 50, described in more detail with respect to FIG. 2, is operatively connected to the engine 14, and to the module 22 via CAN busses. The electronic controller 50 controls operation of the engine 14, and the throttle motor 57 according to a stored algorithm 100.

The engine 14 has an electronically-controlled throttle system 52 that includes a throttle 54, shown in FIG. 2. The throttle 54 is adjustable to change the power output of the engine 14 by controlling the air flow rate through a manifold 56. The controller 50 further controls the throttle 54.

Referring again to FIG. 1, the engine 14 does not directly power the output member 39 and does not power the output member 39 through the planetary gear set 30, but only powers the first motor/generator 16. Therefore, the default (i.e., unpowered) throttle position need not be set to provide a low engine-output "limp home" mode in the event electrical power is not available, such as it is in the case of a typical non-hybrid or non-extended range hybrid application. Accordingly, system efficiency is increased by setting the default position of the throttle 54 to the optimal operating state of the engine 14. The "optimal operating state" is the engine speed and air/fuel ratio (determined in part by throttle position) at which the engine 14 runs in the most fuel efficient manner.

Figure 5:
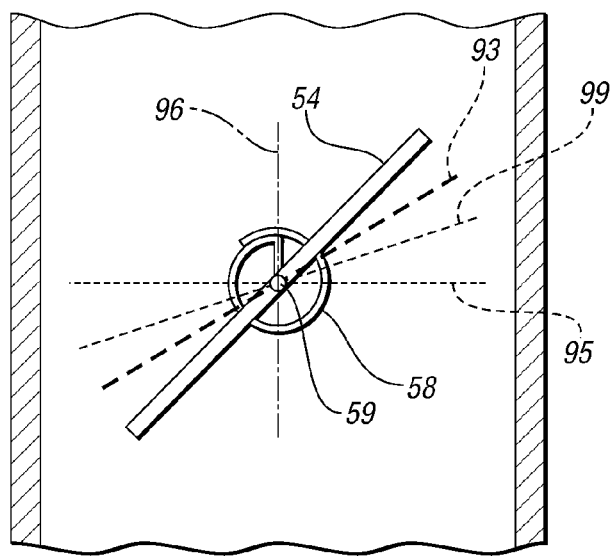
FIG. 5 is a schematic cross-sectional illustration of the throttle of FIG. 2 shown in different positions.

Referring to FIG. 2, the electronically-controlled throttle system 52 is shown in more detail. The throttle 54 is a butterfly-type valve that is mounted to control airflow into a manifold 56 of the engine 14. The throttle 54 is adjustable in position by an electronic throttle motor 57, also referred to as an actuator. The throttle motor 57 has to overcome the biasing force of a torsion spring 58, also referred to as a biasing member, when positioning the throttle 54. The torsion spring 58 biases the throttle 54 to a default position, i.e., a position in which the throttle motor 57 is de-energized. The default position is chosen to be the throttle position at which the engine 14 is in the predetermined optimal state. First and second sensors 62, 66 are operable to determine the position of the throttle 54, and send a sensor signal to a throttle controller 68, which may be a portion of the powertrain controller 50. Referring to FIG. 5, the throttle 54 is shown in the default (de-energized throttle motor) position with the spring 58 at an unstressed position. There may be another like spring on the opposing end of the throttle shaft 59. The throttle motor 57 of FIG. 2 acts to rotate the throttle shaft 59.

Referring again to FIG. 2, an accelerator pedal 72 is equipped with a position sensor 74 that sends a signal to the powertrain controller 50 indicative of the pedal position and thus the desired power output at the output member 39 of FIG. 1. The pedal 72 is not mechanically connected to the throttle 54, so there is no necessary correlation between pedal position and throttle position. The pedal signal is received by a main microcontroller 76 of the powertrain controller 50. The microcontroller 76 includes input/output hardware 78 that passes the throttle position signals and pedal position signal to a central processor 80 configured to perform stored algorithms to control the engine 14. The module 22 of FIG. 1 includes a controller that controls the first motor/generator 16, the second motor/generator 18, the clutches 42, 44 and the brake 40. The processor 80 of FIG. 2 may access stored memory 82 to carry out the algorithms. The throttle controller 68 also responds to the throttle position signal and to output from the input/output hardware 78 to send a control signal 83 to control the throttle motor 57. The control signal 83 may be correlated with the level of current provided to the throttle motor 57, and thus to the position of the throttle 54. The throttle controller 68 also includes a stored algorithm 100 for controlling throttle position. The algorithm 100 includes a portion that functions as a timer 88 as discussed below.

Figure 3:
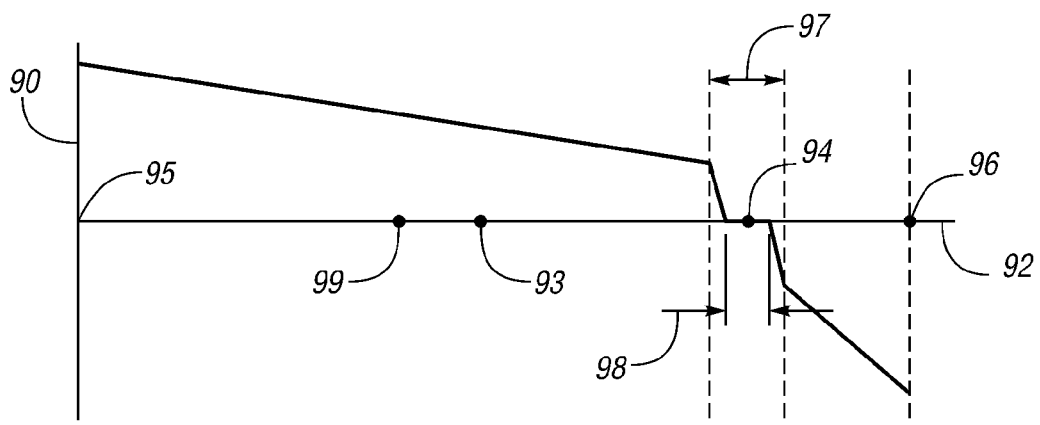
FIG. 3 is a plot of spring force versus throttle position for the throttle control system of FIGS. 1 and 2.

Referring to FIGS. 3 and 5, the relationship is shown between the force of spring 58 (of FIG. 5) indicated as the Y-axis 90 and the position of the throttle 54 indicated as the X-axis 92. The default position (unstressed position of the spring 58) corresponding with a throttle position when the throttle motor 57 is de-energized is indicated as position 94. The unstressed or default position 94 of the throttle 54 is between a fully closed position 95 at the origin (also indicated in FIG. 5) and a fully open position 96, also indicated in FIG. 5. In region 97, the spring force is absent or below a minimal level, and the engine 14 operates at a predetermined optimal state. The algorithm 100 of FIGS. 2 and 4 de-energizes the throttle 54 when the spring position is within the default region 94 (i.e., within a predetermined range of the default position 94) for a predetermined period of time determined by the portion of the algorithm 100 that functions as a timer 88, and assuming other conditions are also met, as discussed below. The de-energized offset is defined as one-half of the width of the default region 97. Thus, if the difference between the actual position of the throttle 54, as indicated by position sensors 62, 66, and the default position 94 is not greater than one-half of the width of the default region 97, then the throttle motor 57 is de-energized, assuming other conditions discussed below are also met. A settling region for the spring 54 to reduce oscillations and settle to the default position 94 is the region 98 in FIG. 3. As discussed below, the controller 68 of FIG. 2 monitors the spring position after throttle de-energization to ensure that the spring 58 remains within the settling region 98, i.e., that the difference between the actual position indicated by the sensors 62, 66 and the default position 94 is not greater than one-half the width of the settling region 98.

Furthermore, the algorithm 100 causes the throttle 54 to be placed in a position 93 between the default position 94 and a fully-closed position 95 when a state of charge of battery 20 of FIG. 1 is above a predetermined level considered to be too high, requiring some discharge. At position 93, engine friction causes the engine 14 to provide less energy for the first motor/generator 16, and stored energy from the battery 20 is used to meet the desired power indicated by the position of accelerator pedal 72, decreasing the state of charge of the battery 20. An increase in motor current is required to drive the throttle 54 to position 93, thus also decreasing the state of charge of the battery 20.

The algorithm 100 causes the throttle 54 to be placed in a position 99 between the default position 94 and the fully closed position 95 when the second motor/generator 18 is controlled to function as a generator during regenerative braking to slow the output member 39 of FIG. 1. With the throttle 54 in position 99, also shown in FIG. 5, the engine 14 runs in a less efficient state than the optimal state at the default throttle position 94. An increase in current to the motor 57 is required to drive the throttle 54 to position 99, thus also using some of the electrical power generated during regenerative braking.

Figure 4:
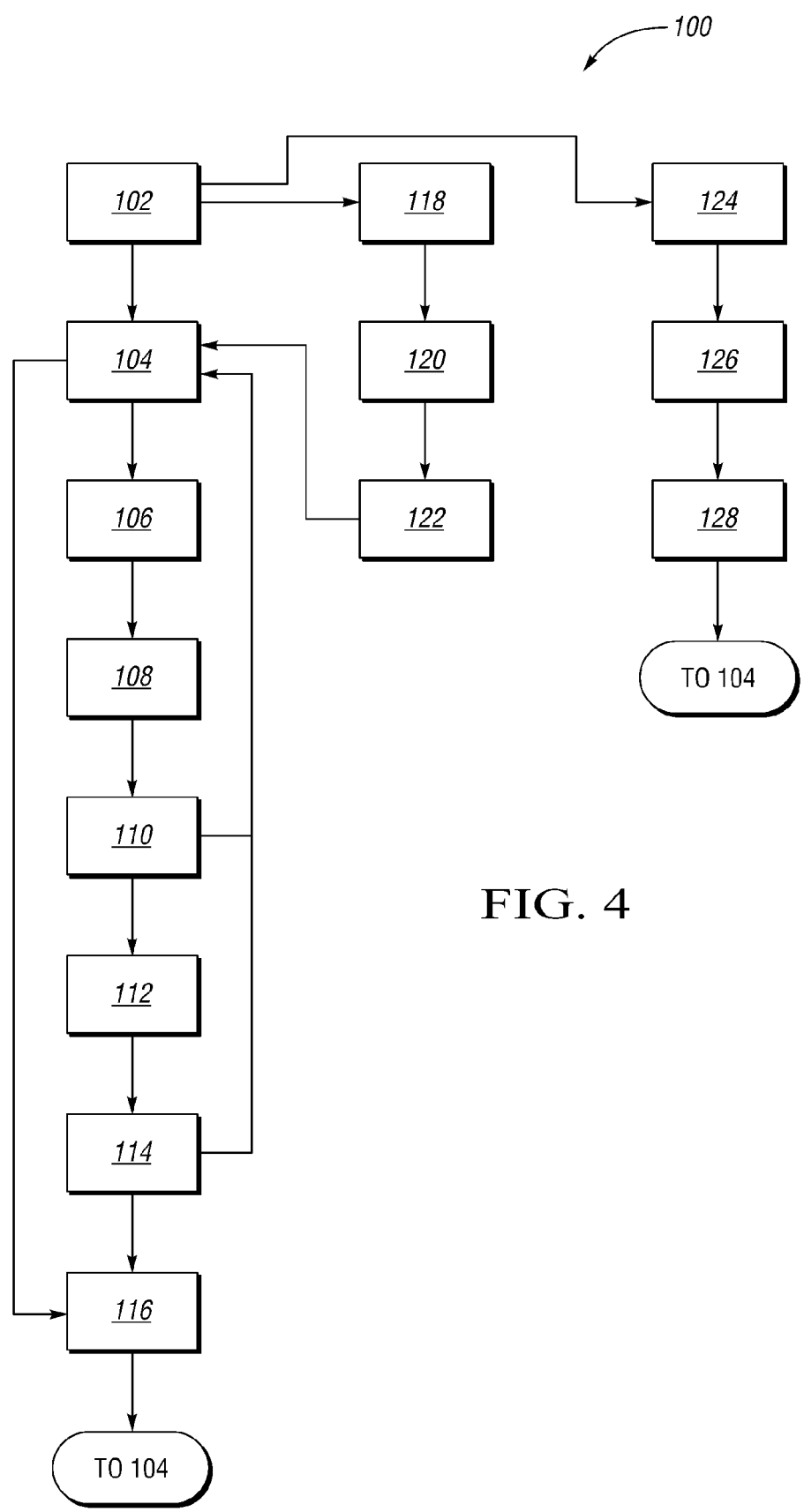
FIG. 4 is a flow diagram of a method of controlling the throttle of FIG. 2.

Referring to FIG. 4, a flow diagram of the algorithm 100 is shown. The algorithm 100 is also referred to as a method 100. Specifically, the flow diagram is a method 100 of controlling the electronic throttle 54 of the powertrain 12 described above in FIGS. 1-3 and 5. The method 100 begins with step 102, learning the default position of the throttle 54. The controller 68 sends a signal to the throttle motor 57 to energize the throttle motor 57 and move the throttle motor 57 to different positions to learn where a default (de-energized) position of the throttle 54 is, and to correlate the positions of the throttle 54 with the different control signals sent. This may be referred to as baselining the throttle.

After the default position is learned in step 102, and assuming the throttle motor 57 has not been de-energized (i.e., is currently energized), the method 100 moves to step 104, and determines whether (a) the commanded (desired) position of the throttle 54 is within a predetermined range of the actual (indicated) position of the throttle 54 (indicated by feedback from the throttle sensors 62, 66 to the throttle controller 68), and (b) the actual position of the throttle 54 is within the same predetermined range of the default (de-energized) throttle position. The determinations of step 102 are indicated as follows:

(a) ABSOLUTE (Desired Throttle Position−Indicated Default Position)<=Default De-energized Offset AND
(b) ABSOLUTE (Indicated Throttle Position−Indicated Default Position)<=Default De-energized Offset, where the Desired Throttle Position is the throttle position commanded by the throttle controller 68, the Indicated Default Position is the default throttle position indicated in step 102, the Indicated Throttle Position is the throttle position indicated by the sensors 62, 66, and Default De-energized Offset is a predetermined range of positions from the indicated default position.

If both determinations (a) and (b) of step 104 are determined to be true, then the portion of algorithm 100 that functions as a timer 88 is started in step 106. The purpose of the portion of algorithm 100 that functions as timer 88 is to ensure that the throttle 54 is commanded to be within the predetermined range 97 of the default position 94 of FIG. 3, and that the actual position of the throttle 54 is indeed within the predetermined range 97 of the default position 94 for a predetermined period of time before de-energizing the throttle motor 54. If either (a) or (b) is not true, then the method 100 moves to step 116, where it is confirmed that the portion of algorithm 100 that functions as timer 88 is not running and that the throttle motor 57 is not de-energized.

In step 108, if the determinations (a) and (b) of step 104 remain true, a determination is made whether the predetermined period of time (referred to below as De-energized Stable Time) has passed. If the predetermined period of time has passed, then the throttle motor 57 is de-energized in step 110. If the determinations of step 104 are no longer true, then the portion of algorithm 100 that functions as timer 88 is stopped in step 116, and the method 100 returns to step 104. If, however, the throttle 54 was de-energized in step 110, the portion of algorithm 100 that functions as a timer 88 increments in step 112, unless an additional settling time (referred to as De-energized Settling Time) has passed after the predetermined period of time. If the additional settling time has already passed, then the method 100 moves from step 110 back to step 104. During the De-energized Settling Time, the method 100 not only continues to determine whether the determinations of step 104 are true, but also determines in step 114 whether the actual throttle position indicated by sensors 62, 66 remains within another predetermined range, referred to as De-energized Settling Offset. That is, the method 100 determines in step 114 whether the following are true:

(c) De-energized Timer<(De-energized Stable Time+De-energized Settling Time) AND
(d) ABSOLUTE (Indicated Throttle Position−Indicated Default Position)<=De-energized Settling Offset.

If (c) and (d) are true, then the portion of algorithm 100 that functions as timer 88 is incremented in step 114, and then the method 100 returns to step 104. If either (c) or (d) is not true, such as if the actual position of the throttle 54 goes outside of the settling offset 98 of the default position 94 before the stable time and the settling time have passed, then the method 100 moves to step 116 in which the portion of algorithm 100 that functions as timer 88 is stopped and the throttle 54 is energized. After the predetermined period of time as well as the settling time has passed, then as long as the determinations of (a) and (b) of step 104 remain true, the throttle 54 remains de-energized. However, if either of (a) and (b) are not true (i.e., if the desired throttle position or the actual throttle position as indicated by the controllers 50, 68 is beyond the predetermined range 97 of the default position), then the method 100 moves from step 104 to step 116, the portion of algorithm 100 that functions as timer 88 is stopped, and the throttle motor 57 is energized.

In addition to de-energizing the throttle 54 under the conditions described above, the method 100 also controls the throttle position in response to the state of charge of the battery 20 simultaneously with carrying out steps 102 to 116. Specifically, after learning the default position in step 102, and during all vehicle operation, the controller 50 periodically determines in step 118 whether the state of charge of battery 20 is above a predetermined level. If the state of charge is not above the predetermined level, then the method 100 continues at step 104. If the state of charge of battery 20 is above the predetermined level, then in step 120, the throttle controller 68 commands the throttle motor 57 to position the throttle 54 at position 93 of FIGS. 3 and 5, so that the engine 14 of FIG. 1 will run at a less optimal operating state, requiring energy stored in the battery 20 to be used to power the motor/generator 18. After step 120, the controller 50 determines in step 122 when the battery state of charge has been reduced to below the same or a lower predetermined level. Once it has been reduced, the method 100 returns to step 104, and the throttle position is determined according to steps 104 to 116.

The method 100 also controls the throttle 54 to position 99 of FIGS. 3 and 5 when the controller 50 determines in step 124 that regenerative braking is in order to recapture braking energy. If regenerative braking is in order, then the method 100 moves to step 126, and energizes the throttle motor 57 to position the throttle 54 at position 99, so that the engine 14 of FIG. 1 will run at a less optimal operating state, increasing engine friction for power reduction during braking. In step 128, if the controller 50 determines that vehicle operating conditions have changed to no longer require regenerative braking, then the method 100 returns to step 104 and the throttle position is determined according to steps 104 to 116.

As described above, the method 100 is able to de-energize the throttle motor 57 and monitor the powertrain 12 so that the throttle motor 57 is energized (a) if the position of the throttle 54 doesn't stay within a predetermined range 97 of the default position 94 for a given time period, (b) if operating conditions change, such as a commanded throttle position is beyond a predetermined range 98 of the default position, such as in response to operator input on the accelerator pedal 72, (c) if a battery state of charge is above a predetermined level, or (d) if regenerative braking is in order, all of which indicate that the throttle motor 57 should be energized.

While the best modes for carrying out the invention have been described in detail, those familiar with the art to which this invention relates will recognize various alternative designs and embodiments for practicing the invention within the scope of the appended claims.

The invention claimed is:

1. A method of controlling an electronic throttle on an engine of a hybrid powertrain, wherein the engine powers a first motor/generator which functions as a generator to power a second motor/generator that powers an output member; wherein the electronic throttle is adjustable by a throttle motor and is biased to a de-energized position when the throttle motor is off, comprising:
  determining whether both a commanded position of the throttle and an actual position of the throttle are within a predetermined range of the de-energized position;
  starting a timer if both the commanded position of the throttle and the actual position of the throttle are determined to be within the predetermined range of the de-energized position; and
  de-energizing the throttle motor when the timer has been on for at least a predetermined period of time; wherein the de-energized position is selected for the engine to operate in a predetermined optimal state to power the first motor/generator.

2. The method of claim 1, further comprising:
  after the throttle motor is de-energized, incrementing the timer until after the predetermined period of time plus an additional settling time has passed if the actual position of the throttle remains within another predetermined range of the de-energized position and both the commanded throttle position and the actual position of the throttle remain within the predetermined range of the de-energized position.

3. The method of claim 2, further comprising:
  after the throttle motor is de-energized, resetting the timer and energizing the throttle motor if at least one of the actual position of the throttle and the commanded throttle position is outside of the predetermined range of the de-energized position or the actual position of the throttle is outside of the another predetermined range of the de-energized position.

4. The method of claim 2, wherein a battery is connected to the first motor/generator and to the second motor/generator; and further comprising:
  energizing the throttle motor so that the throttle adjusts to a position between the default position and a fully closed position when a state of charge of the battery is above a predetermined level.

5. The method of claim 2, wherein a battery is connected to the first motor/generator and to the second motor/generator; and further comprising:
  controlling the second motor/generator to function as a generator to provide electrical power to the battery during braking; and
  energizing the throttle motor so that the throttle adjusts to a position between the default position and a fully closed position when the second motor/generator functions as a generator.

6. A method of controlling a throttle on an engine of a hybrid powertrain, wherein the engine powers a first motor/generator which functions as a generator to power a second motor/generator that powers an output member, wherein the throttle is adjustable by an electric throttle motor and is biased to a de-energized position when the throttle motor is de-energized; wherein a battery is connected to the first motor/generator and to the second motor/generator; the method comprising:
  determining whether both a commanded position of the throttle and an actual position of the throttle are within a predetermined range of the de-energized position;
  starting a timer if both the commanded position of the throttle and the actual position of the throttle are determined to be within the predetermined range of the de-energized position;
  de-energizing the throttle motor when at least a predetermined period of time has passed since the timer was started; wherein the de-energized position is selected for the engine to operate in a predetermined optimal state to power the first motor/generator to act as a generator;
  energizing the throttle motor so that the throttle adjusts to a first position between the default position and a fully closed position when a state of charge of the battery is above a predetermined level;
  controlling the second motor/generator to function as a generator during braking; and
  energizing the throttle motor so that the throttle adjusts to a second position between the default position and a fully closed position when the second motor/generator functions as a generator.

* * * * *